United States Patent
Kuwabara et al.

(10) Patent No.: US 11,524,602 B2
(45) Date of Patent: Dec. 13, 2022

(54) CHARGE CONTROL DEVICE AND CHARGE CONTROL METHOD

(71) Applicant: PANASONIC INTELLECTUAL PROPERTY MANAGEMENT CO., LTD., Osaka (JP)

(72) Inventors: Takashi Kuwabara, Kanagawa (JP); Hiroshi Takichi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 424 days.

(21) Appl. No.: 16/778,207

(22) Filed: Jan. 31, 2020

(65) Prior Publication Data

US 2020/0247267 A1 Aug. 6, 2020

(30) Foreign Application Priority Data

Feb. 5, 2019 (JP) .............................. JP2019-018891

(51) Int. Cl.
*B60L 58/12* (2019.01)
*H02J 7/00* (2006.01)
(Continued)

(52) U.S. Cl.
CPC ............ *B60L 58/12* (2019.02); *B60R 16/033* (2013.01); *H02J 7/0047* (2013.01); *H02J 7/0063* (2013.01); *H02M 3/156* (2013.01); *B60L 2210/10* (2013.01)

(58) Field of Classification Search
None
See application file for complete search history.

(56) References Cited

U.S. PATENT DOCUMENTS 5,677,614 A 10/1997 Ohmori et al.
11,309,592 B2 * 4/2022 Zhong ................. H02J 7/00308
(Continued)

FOREIGN PATENT DOCUMENTS

JP 09-037478 2/1997
JP 2006-158043 6/2006
(Continued)

OTHER PUBLICATIONS

Office Action from Japan Patent Office (JPO) in Japanese Patent Appl. No. 2019-018891, dated Aug. 2, 2022, together with an English language translation.

*Primary Examiner* — Jared Fureman
*Assistant Examiner* — Aqeel H Bukhari
(74) *Attorney, Agent, or Firm* — Greenblum & Bernstein, P.L.C.

(57) ABSTRACT

A charge control device includes: a voltage generator which receives an input voltage and generates an output voltage; a power feeding circuit which supplies the output voltage to a terminal via a voltage supply line; and a control circuit. The control circuit is configured to make the power feeding circuit supply the output voltage when a value of the input voltage or the output voltage is equal to or higher than a first threshold value; electrically cut off the supply of the output voltage by the power feeding circuit when the value of the input voltage or the output voltage is less than the first threshold value; and resume the supply of the output voltage by the power feeding circuit when the value of the input voltage or the output voltage returns to be equal to or higher than the first threshold value.

16 Claims, 12 Drawing Sheets

(51) Int. Cl.
*B60R 16/033* (2006.01)
*H02M 3/156* (2006.01)

(56) References Cited

U.S. PATENT DOCUMENTS

| | | |
|---|---|---|
| 2015/0203059 A1 | 7/2015 | Narita |
| 2016/0065084 A1 | 3/2016 | Suzuki et al. |
| 2016/0116925 A1* | 4/2016 | Freeman ................. H02M 1/36 |
| | | 307/130 |
| 2016/0254687 A1* | 9/2016 | Tanaka .................. H02J 7/1461 |
| | | 320/112 |
| 2016/0267367 A1 | 9/2016 | Uno et al. |
| 2017/0279275 A1* | 9/2017 | Yamamoto ............ H02J 7/0063 |
| 2017/0327002 A1* | 11/2017 | Lilly ....................... B60L 15/08 |

FOREIGN PATENT DOCUMENTS

| | | |
|---|---|---|
| JP | 2010-213559 | 9/2010 |
| JP | 2012-055133 | 3/2012 |
| JP | 2015-134591 | 7/2015 |
| JP | 2016-052186 | 4/2016 |
| JP | 2016-168758 | 9/2016 |

* cited by examiner

CHARGE CONTROL DEVICE AND CHARGE CONTROL METHOD

FIELD

The present disclosure relates to a charge control device and a charge control method.

BACKGROUND

An in-vehicle device which uses a battery and can charge a portable terminal connected to one of a plurality of connection ports is known (see JP-A-2015-134591). The in-vehicle device monitors the battery voltage, and when the battery voltage falls below a threshold value, the in-vehicle device determines a connection port which may be disconnected and cuts off power supply to the connection port which may be disconnected. On the other hand, the in-vehicle device continues to supply power to a port which is not allowed to be disconnected, such as the port used for playing music, making a call, updating software, or the like by connecting to the mobile terminal.

SUMMARY

In a case of a vehicle having an idling stop function, the battery voltage temporarily decreases due to cranking when an engine is started. The in-vehicle device of JP-A-2015-134591 continues to use the mobile terminal within an allowable power range when the battery voltage decreases. However, the in-vehicle device does not consider anything about temporarily stopping the power supply to the mobile terminal and restarting the power supply to the mobile terminal after the battery voltage is recovered.

In many cases, a charger mounted on a vehicle resumes power supply to a mobile terminal when the battery voltage recovers after the power supply to the mobile terminal is stopped due to a decrease in the battery voltage. However, there are cases where the portable terminal cannot be charged even when the charger is ready to supply power. For example, even when the charger stops power supply to a smartphone being charged and then resumes power supply due to the recovery of the battery voltage, the smartphone may not accept this power supply and may not resume charging. Even when charging is not resumed, if the smartphone remains connected to the charger via, for example, a universal serial bus (USB), a state in which the smartphone is not charged without the user's awareness may continue for a long time.

The present disclosure is devised in view of the above-described situation of the related art and an object thereof is to provide a charge control device and a charge control method which can improve the resumption probability of charging a terminal when power supply is restored to a state where power can be supplied.

An aspect of the present disclosure provides a charge control device for controlling charging of a terminal, the charge control device including: a voltage generator which receives an input voltage and generates an output voltage corresponding to the input voltage; a power feeding circuit which supplies the output voltage to the terminal via a voltage supply line through which a voltage is supplied to the terminal; and a control circuit which controls supply of the output voltage by the power feeding circuit, wherein the control circuit is configured: to make the power feeding circuit supply the output voltage when a value of the input voltage or a value of the output voltage is equal to or higher than a first threshold value; to electrically cut off the supply of the output voltage by the power feeding circuit when the value of the input voltage or the value of the output voltage is less than the first threshold value; and to resume the supply of the output voltage by the power feeding circuit when the value of the input voltage or the value of the output voltage returns to be equal to or higher than the first threshold value.

Another aspect of the present disclosure provides a charge control method for controlling charging of a terminal, the charge control method including: receiving an input voltage and generating an output voltage corresponding to the input voltage; supplying the output voltage to the terminal via a voltage supply line for supplying a voltage to the terminal; and controlling supply of the output voltage via the voltage supply line, wherein said controlling the supply of the output voltage includes: supplying the output voltage via the voltage supply line when a value of the input voltage or a value of the output voltage is equal to or higher than a first threshold value; cutting off the supply of the output voltage via the voltage supply line when the value of the input voltage or the value of the output voltage is less than the first threshold value; and resuming the supply of the output voltage via the voltage supply line when the value of the input voltage or the value of the output voltage returns to be equal to or higher than the first threshold value.

According to the present disclosure, it is possible to improve the resumption probability of charging a terminal when power supply is restored to a state where power can be supplied.

DETAILED DESCRIPTION

Hereinafter, a charger which is an embodiment that specifically discloses a charge control device and a charge control method according to the present disclosure will be described in detail with reference to the drawings as appropriate. However, more detailed description than necessary may be omitted. For example, detailed descriptions of already well-known matters and repeated descriptions for substantially the same configuration may be omitted. This is to avoid the following description from becoming unnecessarily redundant and to facilitate understanding by those skilled in the art. The accompanying drawings and the following description are provided to enable those skilled in the art to fully understand the present disclosure and are not intended to limit the subject matter described in the claims.

Figure 1:
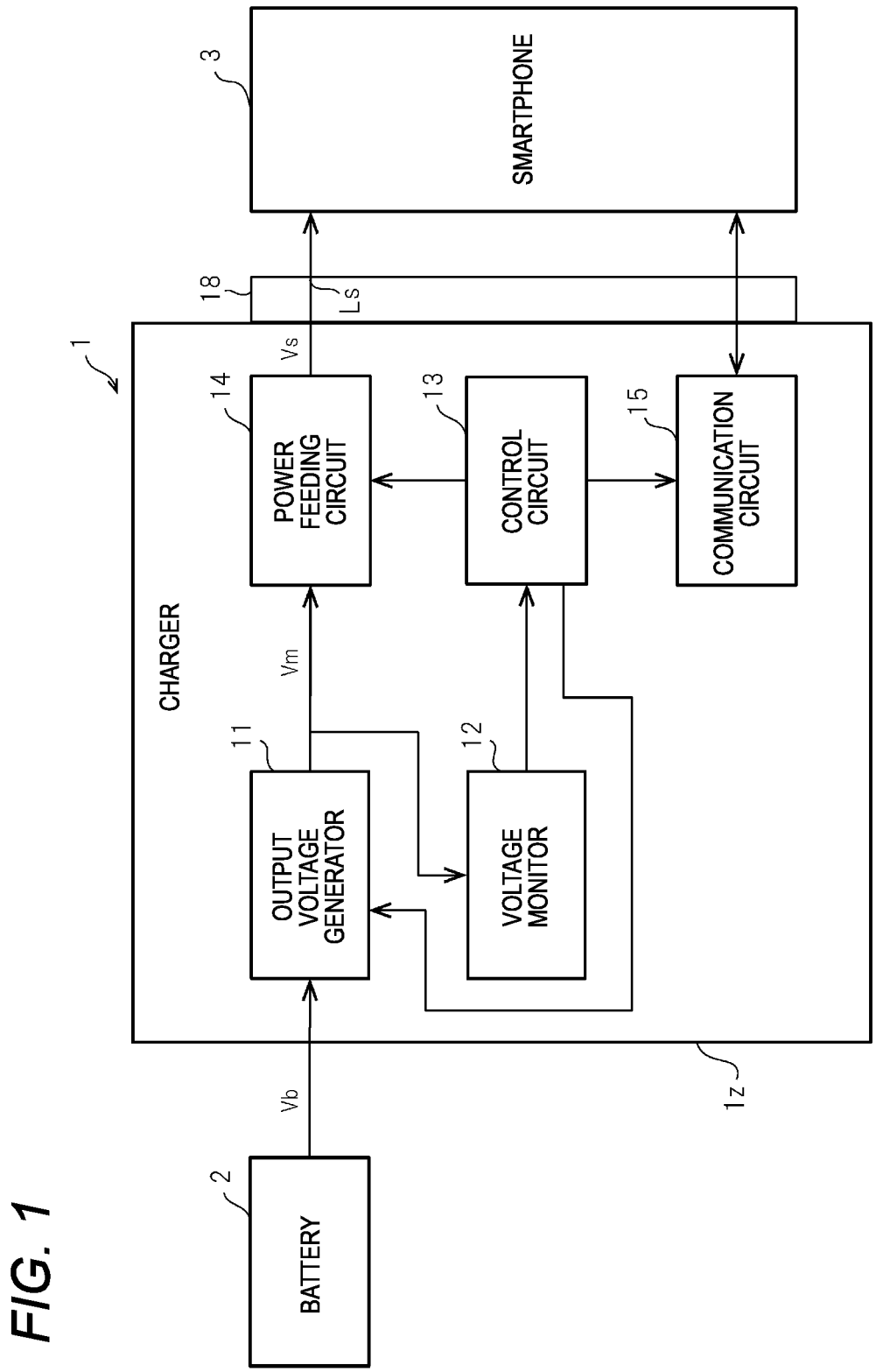
FIG. 1 is a block diagram illustrating an example of a basic configuration of a charger according to an embodiment.

FIG. 1 is a block diagram illustrating an example of a basic configuration of a charger 1 according to an embodiment of the present disclosure.

The charger 1 is mounted on a vehicle, for example, and is connected to an in-vehicle battery 2 as a power source. The charger 1 includes a universal serial bus (USB) connector 18 in, for example, a housing 1z (see FIG. 2). A USB cable is connected to the USB connector 18. The charger 1 uses the battery voltage supplied from the battery 2 to charge a smartphone 3 via the USB connector 18 of the charger 1, the USB cable, and the USB connector of the smartphone 3. The connection part on a device side such as the charger 1 and the smartphone 3 is a USB receptacle and the connection part on a USB cable side is a USB plug. The connection part on a device side such as the charger 1 is, in other words, a USB connector.

The smartphone 3 is an example of an electronic device to be charged. The electronic device may be a tablet terminal, a smart speaker, a digital photo frame, a digital camera, a notebook PC, or the like and is not particularly limited. The interface between the charger 1 and the electronic device is not limited to USB, but may be a local area network (LAN), a high-definition multimedia interface (HDMI) (registered trademark), and the like which are capable of supplying power. The charger 1 may be connected to the electrode terminal of the battery 2 and directly receive the battery voltage or may receive the battery voltage via a car cigar socket.

The charger 1 includes an output voltage generator 11, a voltage monitor 12, a control circuit 13, a power feeding circuit 14, and a communication circuit 15.

The output voltage generator 11 may include a DC-DC converter which performs direct current voltage conversion (DC-DC conversion) for converting a battery voltage Vb of the battery 2 into an output voltage Vm suitable for charging the smartphone 3. In other words, the DC-DC converter receives the battery voltage Vb and generates the output voltage Vm corresponding to the battery voltage Vb. The battery voltage Vb is, for example, a voltage of 9 V to 16 V, for example, 12 V. The output voltage Vm is, for example, 5 V or 9 V. The output voltage Vm may match a charging voltage Vs to the smartphone 3.

The voltage monitor 12 detects the output voltage Vm generated by the output voltage generator 11 and notifies the detected output voltage Vm to the control circuit 13.

The control circuit 13 controls each part in the charger 1. The power feeding circuit 14 controls the voltage supply. The control circuit 13 may normally control the power feeding circuit 14 to supply power to the smartphone 3 when a value of the output voltage Vm detected by the voltage monitor 12 is equal to or higher than a first threshold value VL. When the output voltage Vm detected by the voltage monitor 12 falls below the first threshold value VL, the control circuit 13 may control the power feeding circuit 14 and cut off the power supply to the smartphone 3. Here, the control circuit 13 may electrically cut off a VBUS line Ls. The control circuit 13 may control the communication circuit 15 to cut off the voltage of a communication line CC, for example, or cut off the constant current source, or cut off a D+/D− line and disable communication by the communication circuit 15. The voltage of a communication line CC may be called supply voltage below. The constant current source is a power source which is provided in the charger 1 and supplies current to the smartphone 3. The supply of current to the smartphone 3 is cut off by the interruption of the constant current source.

When the output voltage Vm detected by the voltage monitor 12 exceeds a second threshold value VH after the power supply to the smartphone 3 is stopped (or cut off), the control circuit 13 controls the power feeding circuit 14 and resumes power supply to the smartphone 3. Here, the control circuit 13 may resume the conduction of the VBUS line Ls. The control circuit 13 may control the communication circuit 15 to restore (or recover) the voltage of the communication line CC to a predetermined voltage or to conduct the D+/D− line and resume communication.

When the value of the output voltage Vm detected by the voltage monitor 12 exceeds the second threshold value VH and the electrically interrupted voltage is equal to or less than an invalidation threshold voltage VI, the control circuit 13 may resume power supply to the smartphone 3. The electrically interrupted voltage is, in other words, the charging voltage Vs by the interrupted power feeding circuit 14. The invalidation threshold voltage VI may be a threshold voltage for detecting that the power supply is invalidated. The invalidation threshold voltage VI may be a voltage greater than 0 V and close to 0 V for detecting approximately 0 V. Here, after electrically shutting off the power feeding circuit 14, the control circuit 13 may wait until the charging voltage Vs decreases and reaches a specified value of 0 V based on the time characteristic of the voltage drop, and then the control circuit 13 may resume the voltage supply when the charging voltage Vs is restored. The control circuit 13 may monitor the charging voltage Vs by the power feeding circuit 14 and may wait until the charging voltage Vs decreases and reaches a specified value of 0 V. As a result, the charger 1 reduces the possibility that the power supply to the smartphone 3 is restored without the voltage decreasing to 0 V and the charging by the power feeding circuit 14 is not resumed when the cut-off voltage is restored extremely quickly.

The first threshold value VL may be, for example, 4.5 V or 8.1 V when the supply voltage to the smartphone 3 is 5 V or 9 V. The second threshold value VH is equal to or greater than the first threshold value VL. The first threshold value VL and the second threshold value VH may be fixed values or variable values.

The VBUS line Ls is a line for supplying electric power from the charger 1 to the smartphone 3 and is formed through a VBUS terminal of the USB connector 18 of the charger 1 and a VBUS terminal of the USB connector of the smartphone 3. The communication line CC is formed through a CC1 terminal or a CC2 terminal of the USB connector 18 of the charger 1 and a CC1 terminal or a CC2 terminal of the USB connector of the smartphone 3. The D+/D− line is formed through a D+ terminal or a D− terminal of the USB connector 18 of the charger 1 and a D+ terminal or a D− terminal of the USB connector of the smartphone 3.

Electrical interruption may or may not involve physical interruption or disconnection. The electrical interruption may be electronically controlled.

The power feeding circuit 14 has a switching element for supplying the output voltage Vm generated by the output voltage generator 11 to the smartphone 3. This switching element is a switching element which opens or closes the VBUS line Ls. The power feeding circuit 14 drives the switching element to perform charging, blocking, restarting, or the like with respect to the smartphone 3. On/Off of the switching element may be instructed by the control circuit 13. A field effect transistor (metal-oxide semiconductor field effect transistor (MOSFET)) 141 (see FIG. 4) may be used as the switching element. The MOSFET may be an N-channel MOSFET or a P-channel MOSFET. As the switching element, a bipolar transistor, an insulated gate bipolar transistor (IGBT), a thyristor, a diode, or the like may be used instead of the MOSFET.

The communication circuit 15 communicates with an external communication device. The communication circuit 15 may communicate with the smartphone 3 using the communication line CC. The communication circuit 15 can cut off the supply voltage of the communication line CC or cut off the constant current source to cut off the communication. The communication circuit 15 may perform communication such as negotiation according to a power delivery (PD) protocol via the communication line CC with the smartphone 3 according to an instruction from the control circuit 13. For example, the communication circuit 15 may transmit to the smartphone 3 a request for setting the supply voltage from the charger 1 to the smartphone 3 to 5 V or 9 V. The communication circuit 15 receives a response such as setting the supply voltage to 5 V from the smartphone 3 in response to the request. The communication circuit 15 may set a mode for supplying power to the smartphone 3 using the D+/D− line. The communication circuit 15 can cut the D+/D− line. The D+/D− line may be used when the smartphone 3 which does not implement the PD protocol using the communication line CC is connected to the USB connector 18.

When the supply voltage is determined to be 5 V or 9 V according to the PD protocol, the control circuit 13 may notify the output voltage generator 11 of the output voltage Vm as the determined supply voltage. The threshold voltage may be updated with the change of the supply voltage.

Figure 2:
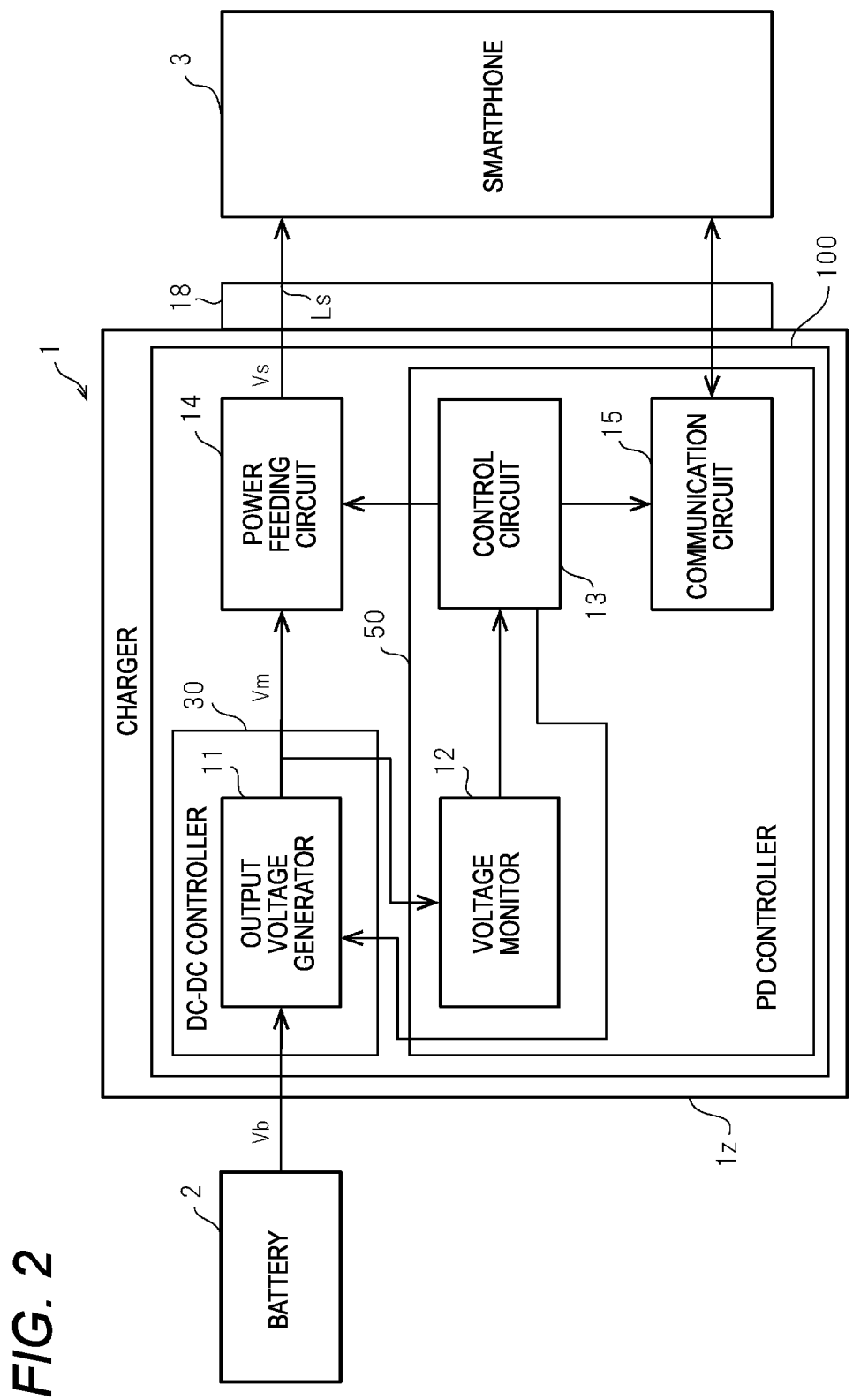
FIG. 2 is a view illustrating electronic components constituting the charger of FIG. 1.

FIG. 2 is a view illustrating electronic components constituting the charger 1. The charger 1 includes a substrate 100 built in the housing 1z. A DC-DC controller 30, a PD controller 50, and the power feeding circuit 14 are mounted on the substrate 100.

The DC-DC controller 30 includes the output voltage generator 11 described above. The PD controller 50 includes the voltage monitor 12, the control circuit 13, and the communication circuit 15 described above. Each of the DC-DC controller 30 and the PD controller 50 is constituted of an integrated circuit (IC) module which is an electronic component. The power feeding circuit 14 includes a MOSFET 141 described above.

Figure 3:
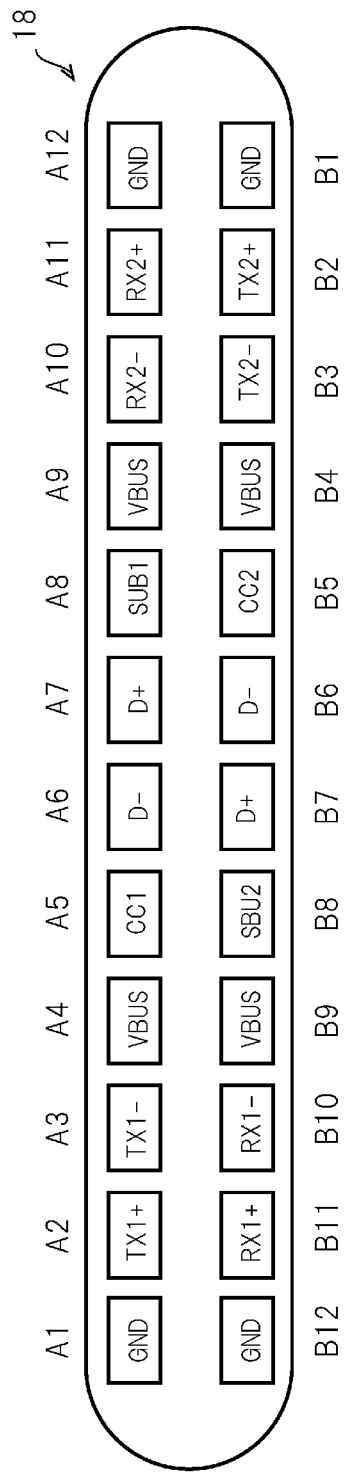
FIG. 3 is a diagram illustrating a pin arrangement of a universal serial bus (USB) connector.

FIG. 3 is a diagram showing a pin arrangement of the universal serial bus (USB) connector 18.

The USB connector 18 may be a USB Type-C connector. With the USB Type-C, high-speed communication with a communication speed of 10 Gbps is possible. The USB Type-C can supply power up to 20 V and 100 W as a PD function. The USB Type-C is compatible with other connectors other than USB Type-C by the alternate mode (or control mode). Other connectors may be a USB 2.0, a USB 3.0, a USB 3.1, an HDMI connector, a D-sub (or 15 pin) connector, a DisplayPort connector, and the like. The standard of the USB connector 18 is not limited to the USB Type-C, but may be the USB 2.0, the USB 3.0, the USB 3.1, or the like.

The USB Type-C connector has a pin arrangement of 24 pins, two stages above and below of the pin terminals A1 to A12 and the pin terminals B1 to B12. The pin terminals A1 to A12 are respectively terminals of a GND (for grounding), an SSTXp1 (SuperSpeed signal line No. 1, TX, positive electrode), an SSTXn1 (SuperSpeed signal line No. 1, TX, negative electrode), a VBUS (bus power supply), a CC1 (for connection config), a D+ (Dp 1, non-SuperSpeed signal line No. 1, positive), a D− (Dn1, non-SuperSpeed signal line No. 1, negative), an SBU (sideband (SBU)), a VBUS (bus power supply), an SSRXn2 (SuperSpeed signal line No. 4, RX, negative electrode), an SSRXp2 (SuperSpeed signal line No. 4, RX, positive electrode), and a GND (for grounding). The pin terminals B1 to B12 are respectively terminals of a GND (for grounding), an SSTXp2 (SuperSpeed signal line 3, TX, positive electrode), an SSTXn2 (SuperSpeed signal line 3, TX, negative electrode), a VBUS (bus power supply), a CC2 (for connection config), a D+ (Dp2, non-SuperSpeed signal line No. 2, positive), a D− (Dn2, non-SuperSpeed signal line No. 2, negative), an SBU2 (sideband (SBU)), a VBUS (bus power supply), an SSRXn1 (SuperSpeed signal line 2, RX, negative electrode), an SSRXp1 (SuperSpeed signal line 2, RX, positive electrode), and a GND (for grounding).

Among those pin terminals, the CC1 terminal and the CC2 terminal included in the communication line CC and the D+ terminal and D− terminal included in the D+/D− line which are used for power delivery (PD) communication will be described in detail and description of the other terminals not directly related to the embodiment is omitted or simplified.

When the smartphone 3 is connected to the charger 1 via the USB connector 18 and the USB cable (not illustrated), the charger 1 is a power supply side, that is, a downstream-facing port (DEF) side, and the smartphone 3 is a power receiving side, that is, an upstream-facing port (UFP) side.

For example, the CC1 terminal or the CC2 terminal on the UFP side and the CC1 terminal or the CC2 terminal on the DFP side are connected to establish the communication line CC. The D+ terminal and the D− terminal on the UFP side and the D+ terminal and the D− terminal on the UFP side are connected to establish the D+/D− line.

When the USB cable is not connected to the USB connector 18 on the DFP side and the USB connector on the UFP side, the CC1 terminal or the CC2 terminal on the DFP side is 5 V or the like by a pull-up resistor Rp. The CC1 terminal or the CC2 terminal on the UFP side is, for example, 0 V by a pull-down resistor Rd.

When the USB cable is connected to the USB connector 18 on the DFP side and the USB connector on the UFP side, the CC1 terminal or the CC2 terminal on the DFP side is connected to the CC1 terminal or the CC2 terminal on the UFP side through its own pull-up resistor Rp and a pull-down resistor Rd on the UFP side via the USB cable. Therefore, the CC1 terminal or the CC2 terminal on the DFP side is set to a constant voltage by the resistance voltage division of the pull-up resistor Rp and the pull-down resistor Rd.

The communication line CC is used for communication related to the negotiation of the PD protocol. When the charger 1 on the DFP side detects that the smartphone 3 on the UFP side is connected to the USB cable, it turns on the VBUS line Ls and supplies a voltage such as 5 V. The smartphone 3 on the UFP side establishes a connection with the charger 1 on the DFP side when a voltage of 5 V is supplied to the VBUS line Ls. With the connection, a request or response regarding power supply (or charging control) is performed.

The D+ terminal and the D− terminal are used to support a legacy type USB 2.0. In the USB Type-C, there are a standard downstream port (SDP), a charging downstream port (CDP), a dedicated charging port (DCP), and the like as ports for supplying power using D+/D− line. The SDP is a port which performs USB standard power supply. The SDP is compatible with USB 2.0, USB 3.0, and USB 3.1 standards. The CDP is a port which supplies power of a maximum of 1.5 A. The DCP is a port which supplies power of 1.5 A or more. In the DCP, communication is not performed. In the DCP, the D+ line and the D− line are short-circuited with a 200Ω resistor.

The D+ terminal and the D− terminal of the USB connector 18 are respectively connected to the D+/D− terminals of the USB cable. The smartphone 3 may perform handshake with the charger 1 via the D+/D− line and recognize whether power is supplied by the SDP, the CDP, or the DCP. The smartphone 3 may output, for example, 0.6 V to the D+ line and measure the voltage of the D− line. When the voltage on the D− line is less than 0.3 V, for example, the smartphone 3 may determine that it is connected to the SDP. When the voltage of the D− line is, for example, equal to or more than 0.3 V and less than 0.8 V, the smartphone 3 may be determined to be connected to the CDP or the DCP. The smartphone 3 outputs, for example, 0.6 V to the D− line and measures the voltage of the D+ line. When the voltage of the D+ line is less than 0.3 V, for example, the smartphone 3 may determine that it is connected to the CDP. When the voltage of the D+ line is, for example, equal to or more than 0.3 V and less than 0.8 V, the smartphone 3 may be determined to be connected to the DCP.

Figure 4:
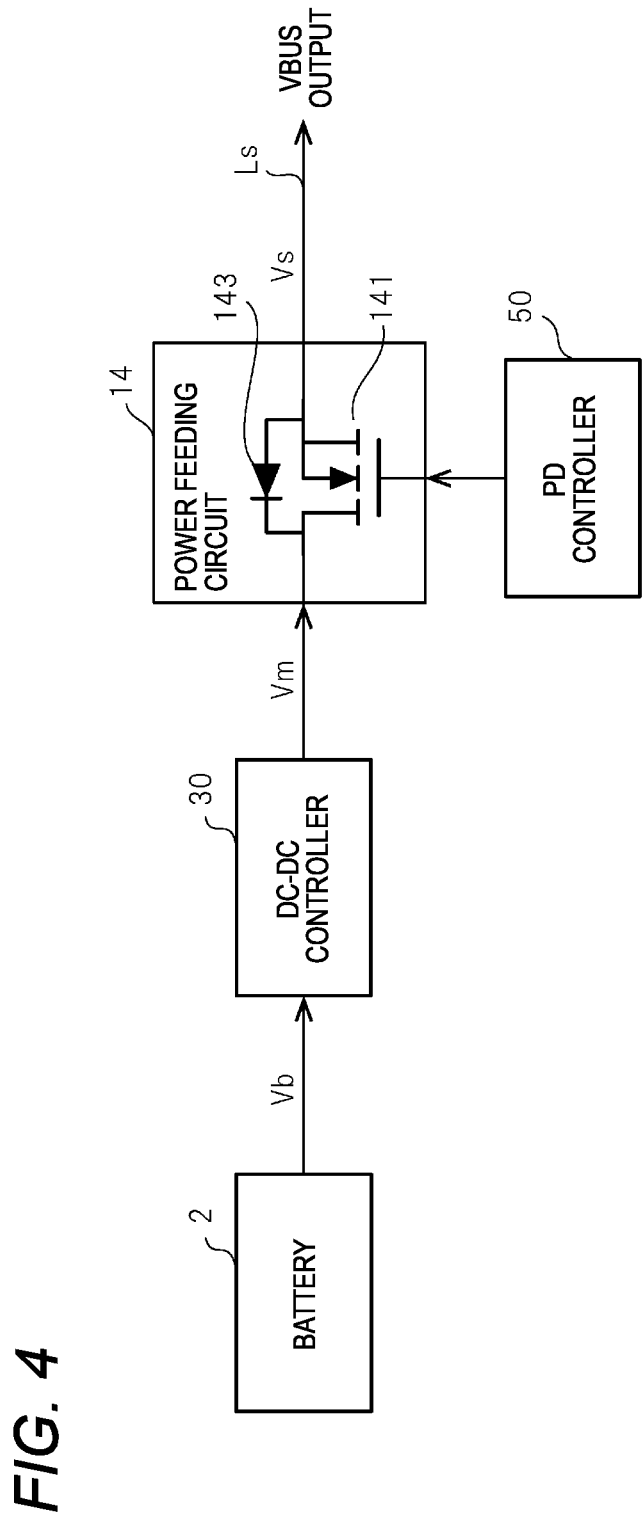
FIG. 4 is a diagram illustrating a schematic configuration in a vicinity of a power feeding circuit in the charger.

FIG. 4 is a diagram illustrating a schematic configuration in a vicinity of the power feeding circuit 14 in the charger 1.

The power feeding circuit 14 includes a MOSFET 141 as a switching element which opens or closes the VBUS line Ls that supplies the output voltage Vm from the DC-DC controller 30 to the smartphone 3. The source of the MOSFET 141 is connected to the output line of the output voltage generator 11 in the DC-DC controller 30. The drain of the MOSFET 141 is connected to the VBUS line Ls. When the smartphone 3 is connected to the USB connector 18 via the USB cable, the VBUS line of the USB cable connected to the smartphone 3 is connected to the VBUS line Ls. When the gate voltage of the MOSFET 141 exceeds a threshold voltage Vth by a signal from the control circuit 13, the source-drain is turned on, and the supply voltage of the output voltage generator 11 is supplied to the smartphone 3.

A parasitic diode 143 exists between the source and drain of the MOSFET 141. The parasitic diode 143 includes a cathode connected to the source and an anode connected to the drain. The parasitic diode 143 can prevent the voltage on the charger 1 side from being unintentionally applied to the smartphone 3 side.

Figure 5:
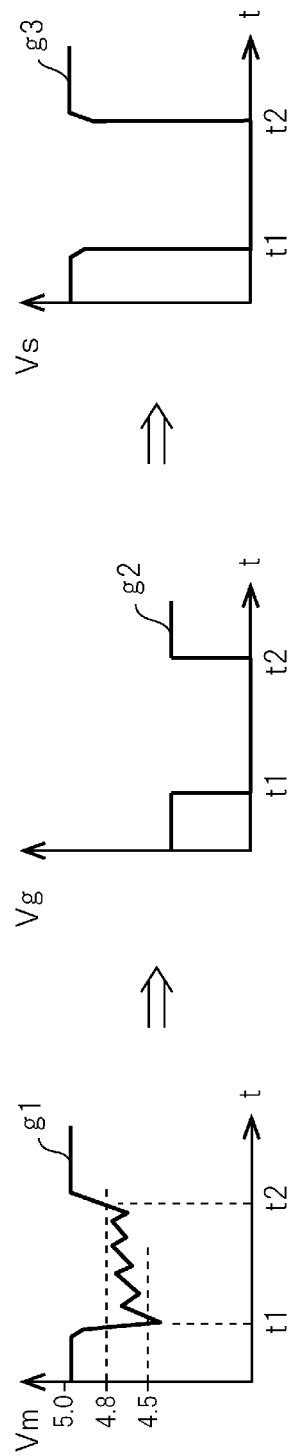
FIG. 5 is a graph illustrating a time change of a voltage in each part for explaining an operation of the power feeding circuit.

FIG. 5 is a graph illustrating a time (t) change of a voltage in each part for explaining an operation of the power feeding circuit 14. Here, a case where the output voltage Vm of the DC-DC controller 30 is 5.0 V is illustrated.

The charger 1 may add hysteresis to the operation of stopping and restarting the power supply to the smartphone 3. For example, the first threshold value VL for stopping the power supply may be set to 4.5 V and the second threshold value VH for restarting the power supply may be set to 4.8 V. The battery voltage Vb can vary depending on the use state of the vehicle-mounted device. In particular, in a vehicle having an idling stop function, the battery voltage can rapidly decrease during a transition such as cranking. In a graph g1, the output voltage Vm generated based on the battery voltage Vb falls below the first threshold value VL at a time t1. Here, the voltage monitor 12 compares the output voltage Vm and the first threshold value VL, but may compare the battery voltage Vb and the first threshold value VL. Here, for example, the battery voltage Vb is 12 V, while the first threshold value VL may be 10.5 V, for example. Similarly, the voltage monitor 12 may compare the battery voltage Vb and the second threshold value VH. Here, for example, the battery voltage Vb is 12 V, while the second threshold value VH may be 11.5 V, for example.

When the output voltage Vm detected by the voltage monitor 12 falls below the first threshold value VL at the time t1, as illustrated in a graph g2, the control circuit 13 may switch a voltage Vg supplied to the gate of the MOSFET 141 to approximately 0 V. "Approximately 0 V" is an example of a voltage equal to or lower than the threshold voltage Vth. Therefore, the MOSFET 141 is turned off and the source and drain are not conducted.

As a result, the USB connector 18 recognizes that the VBUS line Ls is physically disconnected from the smartphone 3.

When the source-drain of the MOSFET 141 is interrupted, as illustrated in a graph g3, the drain voltage of the MOSFET 141, that is, the charging voltage Vs of the VBUS line Ls falls to approximately 0 V at the time t1. The voltage of the VBUS line Ls is not limited to approximately 0 V and may be equal to or lower than a voltage at which the smartphone 3 can determine whether to stop charging. Thereby, charging to the smartphone 3 is stopped.

As the end of the transition period such as cranking approaches, the output voltage Vm generated based on the battery voltage Vb gradually recovers and exceeds the second threshold value VH at the time t2, as illustrated in the graph g1. When the output voltage Vm detected by the voltage monitor 12 exceeds the second threshold value VH at the time t2, as illustrated in the graph g2, the control circuit 13 switches the voltage Vg applied to the gate of the MOSFET 141 to an ON voltage. The ON voltage is a voltage exceeding the threshold voltage Vth. Therefore, the MOSFET 141 is turned on and the source and drain are conducted.

When the source and drain of the MOSFET 141 are conducted, the drain voltage of the MOSFET 141, that is, the charging voltage Vs of the VBUS line Ls is restored to the supply voltage of the output voltage generator 11 at the time t2, as illustrated in the graph g3. Thereby, possibility that the charge to the smartphone 3 will be accepted becomes high.

Figure 6:
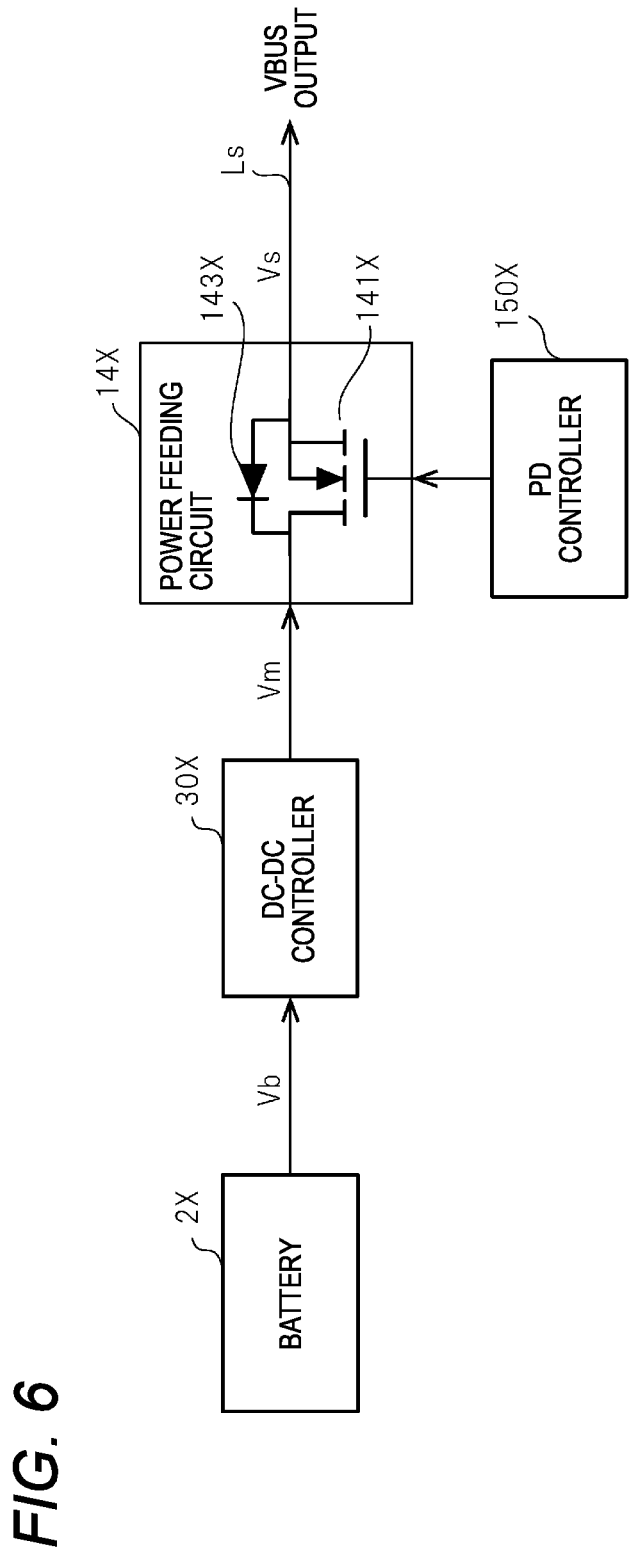
FIG. 6 is a diagram illustrating a schematic configuration in a vicinity of a power feeding circuit in a charger according to a comparative example.
Figure 7:
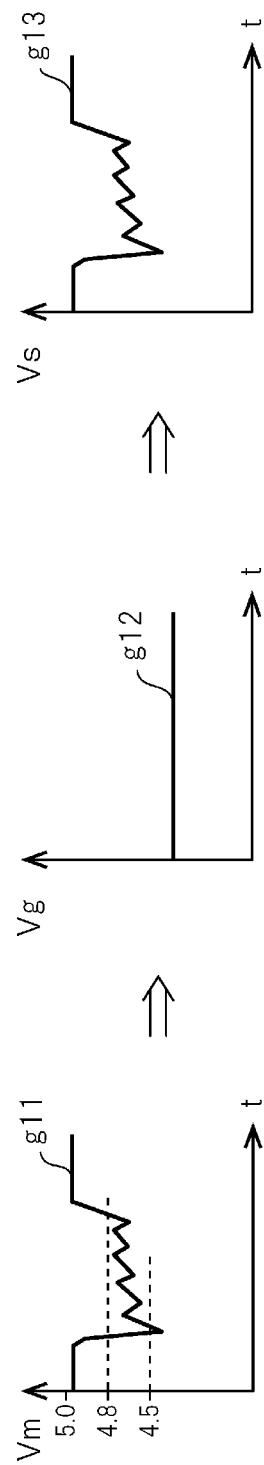
FIG. 7 is a graph illustrating a time change of a voltage in each part for explaining an operation of the power feeding circuit of the comparative example.

FIG. 6 is a diagram illustrating a schematic configuration in a vicinity of a power feeding circuit in a charger of the comparative example. The charger of the comparative example has the same configuration as that of the embodiment except for a PD controller. FIG. 7 is a graph illustrating a time (t) change of a voltage in each part for explaining an operation of the power feeding circuit of the comparative example. In the description of the comparative example in FIGS. 6 and 7, the constituent parts having the same names in the embodiment will be described with "X" at the end.

In the transition period such as cranking, as illustrated in a graph g11, even when the output voltage Vm of the DC-DC controller 30 falls below the first threshold value VL, as illustrated in a graph g12, a control circuit 13X does not change the voltage Vg applied to the gate of a MOSFET 141X and continuously outputs a voltage for turning on the MOSFET 141X. The voltage for turning on the MOSFET 141X is a voltage exceeding the threshold voltage Vth. Therefore, the source and drain of the MOSFET 141 remain conductive. As illustrated in a graph g13, the drain voltage of the MOSFET 141X, that is, the charging voltage Vs of a VBUS line LsX is a voltage that changes according to the fluctuation of the battery voltage Vb. Here, even when the charger 1 stops power supply because the charging voltage Vs falls below the first threshold value VL, and then the voltage is restored until the output voltage Vm exceeds the second threshold value VH, the charger 1 does not determine that charging has been initialized and does not resume charging.

As described above, as in the comparative example, when the gate voltage of the MOSFET of the power feeding circuit is not controlled according to the magnitude of the output voltage Vm, the fluctuation of the battery voltage Vb and the output voltage Vm is transmitted to the smartphone 3. On the other hand, as in the embodiment, when controlling the gate voltage of the MOSFET of the power feeding circuit according to the magnitude of the output voltage Vm, the fluctuations in the battery voltage Vb and the output voltage Vm are not transmitted to the smartphone 3, and the MOSFET is turned off and the charging voltage Vs is set to 0 V when the voltage is halfway. The halfway voltage is, for example, a voltage having a value lower than the first threshold value VL. Therefore, on the smartphone 3 side as well, it is easy to determine the state of the supplied voltage and it is easy to recognize that charging has been resumed after the voltage is restored, and further it is easy to accept the resumption of charging. Therefore, for example, even when the smartphone 3 is designed so that the smartphone 3 will not be charged if the USB cable is not pulled out and connected again when an abnormality occurs in the charging of the smartphone 3, the charger 1 can create a cut-off state in a pseudo manner, and thus it is possible to easily perform resumption of charging by the smartphone 3.

Figure 8A:
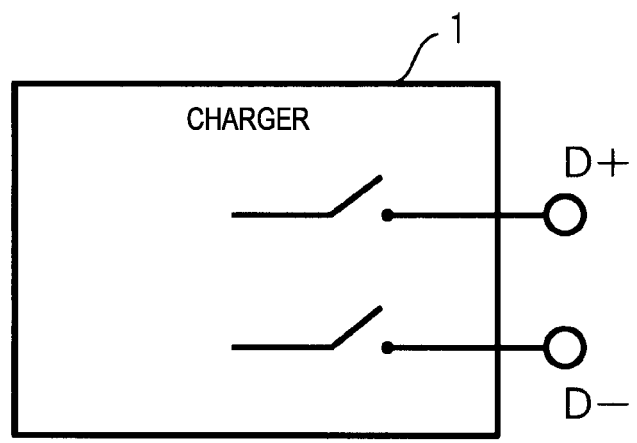
FIG. 8A is a diagram for explaining a disconnection operation of a D+/D− line by a communication circuit in a case of an SDP and a CDP.

FIG. 8A is a diagram for explaining a disconnection operation of a D+/D− line by the communication circuit 15 in a case of an SDP and a CDP.

The communication circuit 15 may be able to freely open and close the D+ line connected to the D+ terminal and the D− line connected to the D− terminal. When the output voltage Vm generated based on the battery voltage Vb falls below the first threshold value VL and power supply to the smartphone 3 stops, the communication circuit 15 may disconnect the D+ line and the D− line for a certain period under the control of the control circuit 13. The certain period may be a period from when the output voltage Vm falls below the first threshold value VL until it re-exceeds the second threshold value VH or may be a period shorter than that. When the VBUS line Ls is electrically cut off and the D+/D− line is disconnected for a certain period, the smartphone 3 recognizes the charge stop. The charge stop is stopping of the power supply from the charger 1.

Figure 8B:
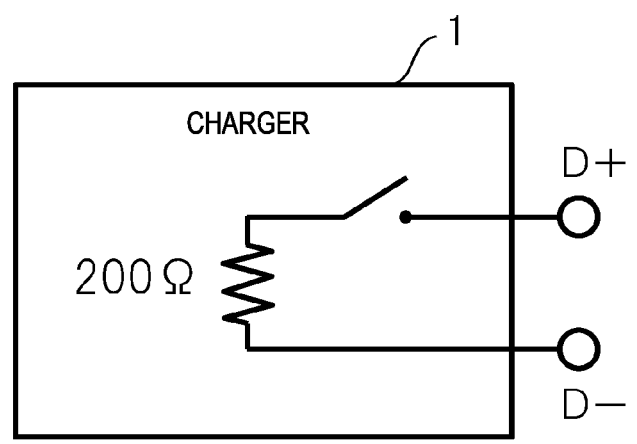
FIG. 8B is a diagram for explaining the disconnection operation of the D+/D− line by the communication circuit in a case of a DCP.

FIG. 8B is a diagram for explaining the disconnection operation of the D+/D− line by the communication circuit 15 in a case of a DCP.

The communication circuit 15 may freely open and close a line that short-circuits the D+ terminal and the D− terminal with a 200Ω resistor. When the output voltage Vm generated with the battery voltage Vb as the power source falls below the first threshold value VL and the smartphone 3 stops charging, the communication circuit 15 may cut a line for short-circuiting the D+ terminal and the D− terminal with the 200Ω resistor for a certain period under the control of the control circuit 13. The certain period may be a period from when the output voltage Vm falls below the first threshold value VL until it re-exceeds the second threshold value VH or may be a period shorter than that. When, with the control circuit 13, the VBUS line Ls is electrically cut off and the line that short-circuits the D+ terminal and the D− terminal with the 200Ω resistor is cut off for a certain period, the smartphone 3 recognizes that charging is stopped. In other words, the smartphone 3 recognizes that power supply from the charger 1 is stopped.

The smartphone 3 may recognize the charge stoppage by at least one of interruption of the VBUS line Ls, interruption of the supply voltage of the communication line CC or interruption of the constant current source, and disconnection of the D+/D− line for a certain period. The interruption of the constant current source is, for example, caused by setting the voltage to approximately 0 V.

Figure 9:
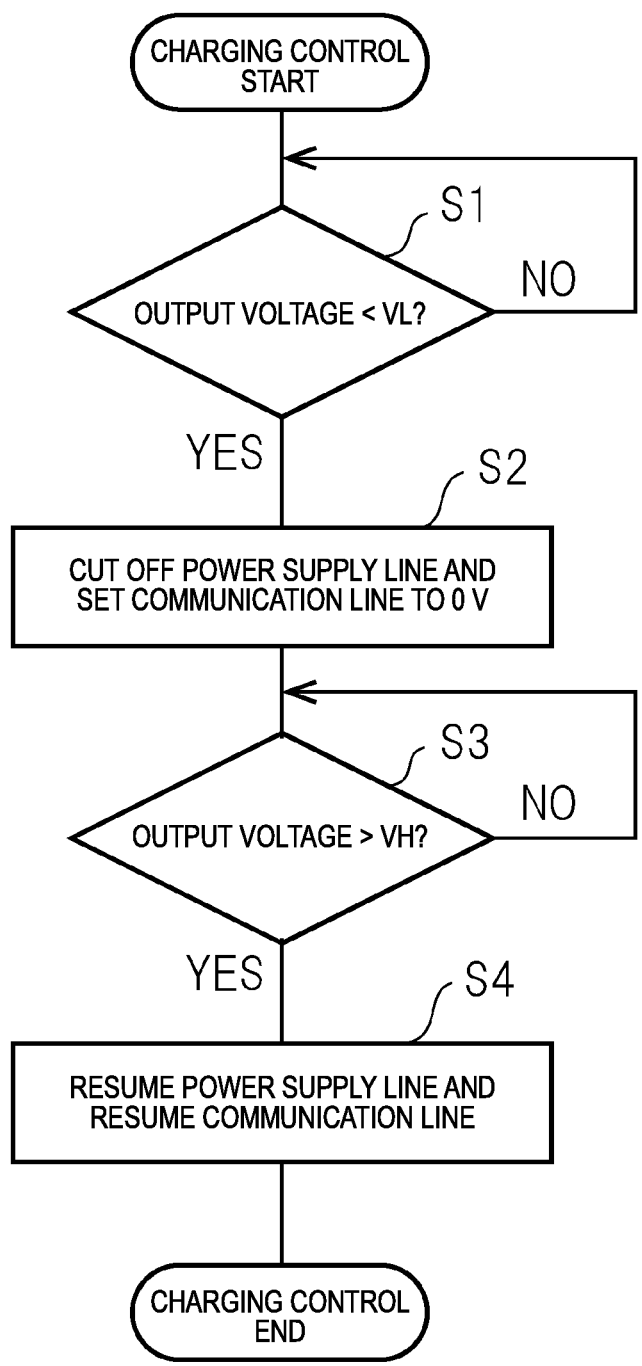
FIG. 9 is a flowchart illustrating a charging control procedure.

The operation of the charger 1 having the configuration described above will be described. FIG. 9 is a flowchart illustrating a charging control procedure. The operation is started, for example, when the charger 1 is turned on. After the activation, the charger 1 starts charging the smartphone 3 connected to the USB connector 18 via the USB cable using the battery voltage Vb supplied from the battery 2 as a power source.

The voltage monitor 12 detects the output voltage Vm supplied from the output voltage generator 11 and determines whether the value of the output voltage Vm is smaller than the first threshold value VL (S1). When the value of the output voltage Vm is equal to or greater than the first threshold value VL, the voltage monitor 12 repeats the process of S1 and continues charging the smartphone 3 (or power supply to the smartphone 3).

In S1, when the value of the output voltage Vm is smaller than the first threshold value VL due to a decrease in the battery voltage Vb or the like, the control circuit 13 turns off the MOSFET 141 by setting the gate voltage input to the MOSFET 141 to less than the threshold voltage Vth and at least the VBUS line Ls is electrically cut off (S2). The control circuit 13 may cut off the supply voltage of the communication line CC or cut off the constant current source to electrically cut off the communication line CC (S2). The control circuit 13 may electrically cut off D+/D− line. The control circuit 13 may cut off the supply voltage of the communication line CC or cut off the constant current source and electrically cut off the D+/D− line. The smartphone 3 can determine that charging has stopped by combining the electrical interruption of the VBUS line Ls and the voltage drop (or electrical interruption) of the communication line CC or/and the electrical disconnection of the D+/D− line.

After the charging is stopped, the voltage monitor 12 detects the output voltage Vm supplied from the output voltage generator 11 and determines whether the value of the output voltage Vm is greater than the second threshold value VH (S3). When the value of the output voltage Vm is equal to or lower than the second threshold value VH, the charger 1 repeats the process of S3 and continues to stop charging the smartphone 3.

In S3, when the value of the output voltage Vm becomes larger than the second threshold value VH due to the restoration of the battery voltage Vb or the like, the control circuit 13 sets the voltage of the gate signal input to the MOSFET 141 to a voltage higher than the threshold voltage Vth, turns on the MOSFET 141, and conducts the VBUS line Ls (S4). The control circuit 13 may be configured so that, when the value of the output voltage Vm becomes larger than the second threshold value VH and the charging voltage Vs becomes equal to or lower than the invalidation threshold voltage Vl, the MOSFET 141 is turned on to make the VBUS line Ls conductive. The control circuit 13 may be configured so that, when the supply voltage of the communication line CC is interrupted or the constant current source is interrupted (in other words, communication line CC is electrically cut off), the supply voltage of the communication line CC is restored or the constant current source is restored from the interruption of the supply voltage of the communication line CC or the interruption of the constant current source, in such a manner that it is conducted (S4). When D+/D– line is electrically cut off, the control circuit 13 may release the electric cut off of D+/D– line and make it conductive. Thereafter, the control circuit 13 ends the operation.

In the charger 1, it is possible to prevent occurrence of a malfunction where, after the charger 1 temporarily stops power supply to the smartphone 3 in a charging state and then resumes power supply by the restoration of the battery voltage, the smartphone 3 does not accept power supply and charging of the battery of the smartphone 3 is not restarted. Therefore, it is possible to prevent that the smartphone 3 remains connected to the charger 1 via the USB connector 18 and the USB cable without resuming the power supply, and thus a user is not aware of this and the smartphone 3 is not charged for a long time. For example, when the battery voltage to the charger 1 mounted on the vehicle drops during cranking and falls into a state where power cannot be supplied, and then the charger 1 returns to a state where power can be supplied, the probability of restarting charging to the smartphone 3 can be improved.

Modification Example 1

Figure 10:
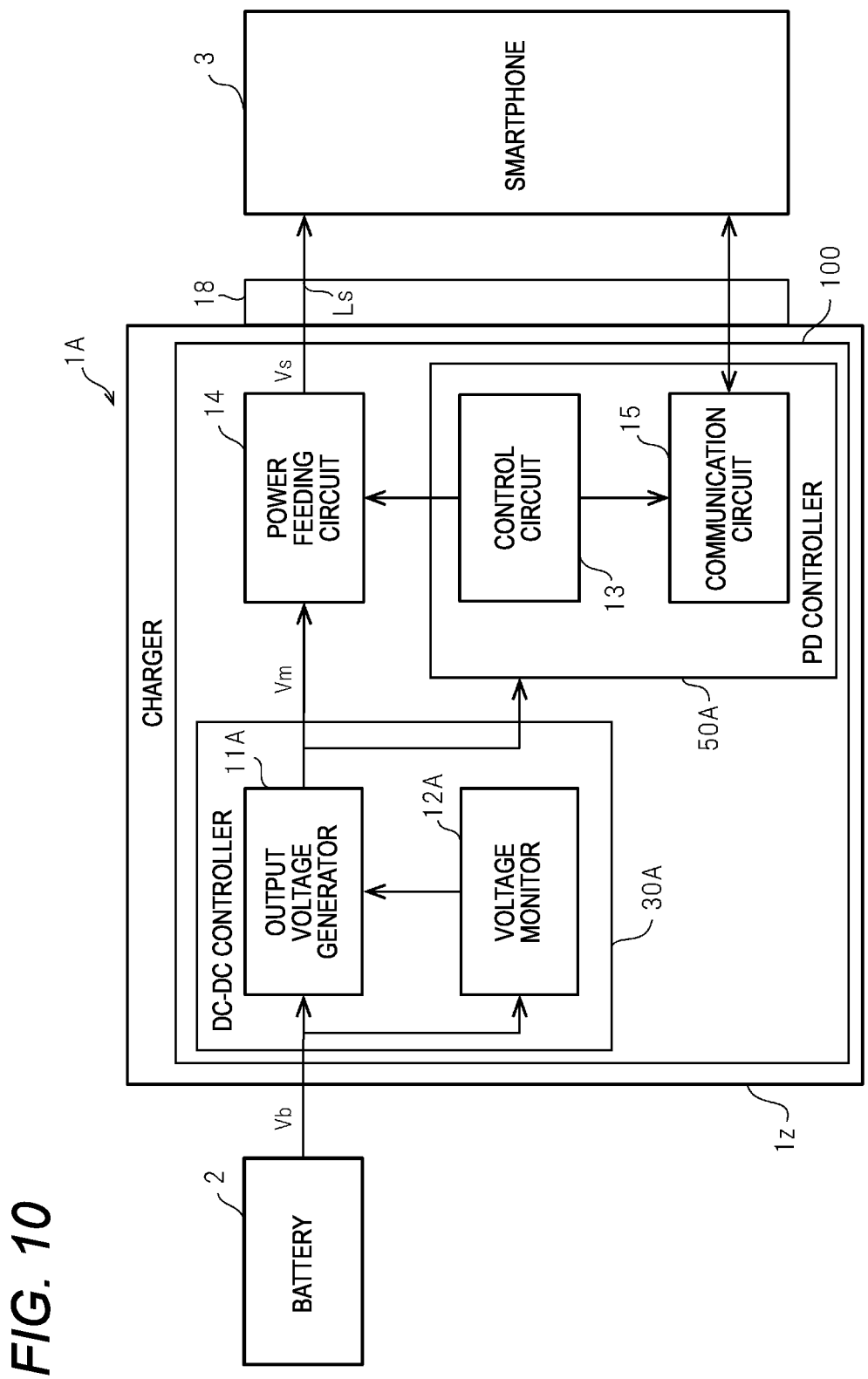
FIG. 10 is a block diagram illustrating a configuration of a charger according to a first modification example.

FIG. 10 is a block diagram illustrating the configuration of a charger 1A in a first modification example. In the charger 1A, a DC-DC controller 30A is constituted of an IC module including an output voltage generator 11A and a voltage monitor 12A. A PD controller 50A is constituted of an IC module including the control circuit 13 and the communication circuit 15.

The voltage monitor 12A detects the voltage on the input side of the output voltage generator 11A, that is, the battery voltage Vb. When the battery voltage Vb falls below the first threshold value VL, the voltage monitor 12A outputs a signal for stopping the operation of the output voltage generator 11A, and then, when the battery voltage Vb exceeds the second threshold value VH, the voltage monitor 12A outputs a signal for restarting the operation of the output voltage generator 11A. Therefore, the output voltage generator 11A outputs the output voltage Vm to the power feeding circuit 14 when the value of the battery voltage Vb is equal to or greater than or first threshold value VL and does not output the output voltage Vm to the power feeding circuit 14 when the battery voltage Vb falls below the first threshold value VL. The output voltage generator 11A resumes the output of the output voltage Vm to the power feeding circuit 14 when the value of the battery voltage Vb is restored to, i.e., returns to be equal to or higher than the first threshold value VL. When the value of the battery voltage Vb is restored to be equal to or higher than the first threshold value VL and the charging voltage Vs becomes equal to or lower than the invalidation threshold voltage Vl, the output voltage generator 11A may resume output of the output voltage Vm to the power feeding circuit 14. The normal voltage of the battery voltage Vb may be 12 V, for example. In this case, the first threshold value VL may be set to 10.5 V, for example. The second threshold value VH may be set to 11.5 V, for example.

When the operation of the output voltage generator 11A stops, the output voltage Vm supplied from the output voltage generator 11A drops to approximately 0 V. Since the source of the MOSFET 141 is a voltage of approximately 0 V, a charging voltage Vs of approximately 0 V is output from the drain of the MOSFET 141. Therefore, the VBUS line Ls connected to the drain of the MOSFET 141 is equal to the cut-off state.

In the PD controller 50A, when the output voltage Vm supplied from the output voltage generator 11A drops to approximately 0 V, the communication circuit 15 may cut off the supply voltage of the communication line CC or cut off the constant current source under the control of the control circuit 13. Here, the communication circuit 15 may electrically disconnect D+/D– line under the control of the control circuit 13.

When the DC-DC controller 30A supplies power to the PD controller 50A, the DC-DC controller 30A may not supply power to the PD controller 50A when the battery voltage Vb falls below the first threshold value VL. When power is not supplied to the PD controller 50A, the PD controller 50A will not operate. Therefore, the communication line CC and D+/D– line are electrically cut off. As a result, the smartphone 3 can determine that the connection with the charger 1 has been released by the electrical disconnection of the VBUS line Ls, the communication line CC, and the D+/D– line. Therefore, the electrical reconnection of the VBUS line Ls, the communication line CC, the D+/D– line, and the like is performed, so that the smartphone 3 is recognized as being reconnected to the charger 1, and thus it is highly likely to resume charging.

The smartphone 3 can determine that the connection with the charger 1 has been released by a combination with at least one of the interruption of the VBUS line, the interruption of the supply voltage of the communication line CC, the interruption of the constant current source, and the disconnection of the D+/D– line. Therefore, by performing electrical reconnection with the VBUS line Ls, the communication line CC, the D+/D– line, or the like, it is possible to recognize that the smartphone 3 has been reconnected to the charger 1, and thus it is highly likely to resume charging.

In the charger 1A, since the DC-DC controller 30A includes the voltage monitor 12A, the configuration of the PD controller 50A can be simplified. The DC-DC controller 30A can lower the voltage of the VBUS line Ls by lowering the battery voltage Vb. Therefore, the charger 1A can simplify the control of the power feeding circuit 14 by the control circuit 13.

Modification Example 2

Figure 11:
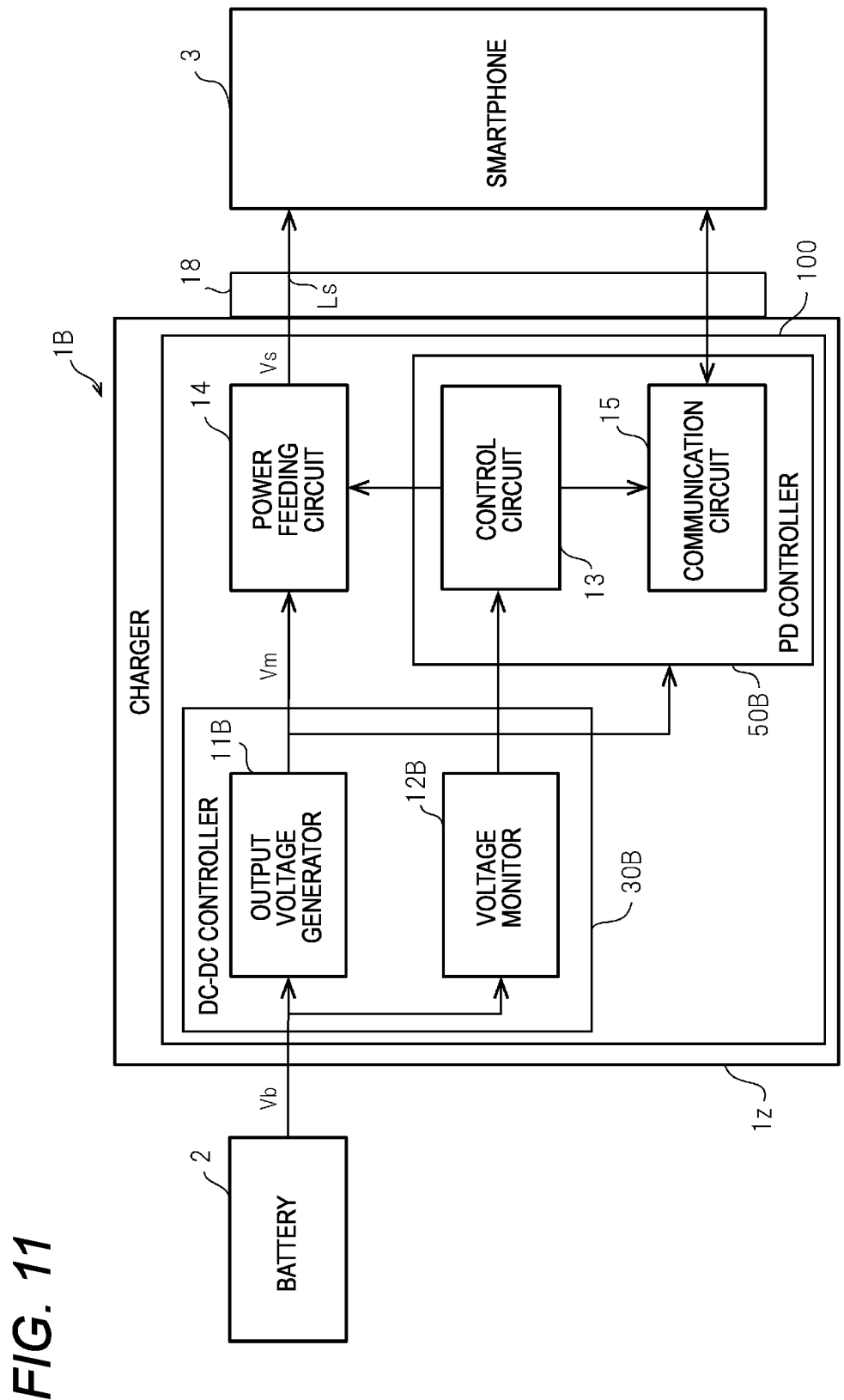
FIG. 11 is a block diagram illustrating a configuration of a charger according to a second modification example.

FIG. 11 is a block diagram illustrating a configuration of a charger 1B in a second modification. The charger 1B in the second modification example of the embodiment has substantially the same configuration as that of the charger 1A in the first modification example. The similar components as those of the charger 1A in the first modification example are denoted by the same reference numerals and letters and the description thereof is omitted.

A voltage monitor 12B of a DC-DC controller 30B detects the voltage on the input side of an output voltage generator 11B. The voltage on the input side of an output voltage generator 11B is, for example, the battery voltage Vb. Then, based on the detection result, a signal for turning off the MOSFET 141 or a signal for turning on the MOSFET 141 is directly output to the control circuit 13. Thereby, the DC-DC controller 30B can control interruption and conduction of the VBUS line Ls.

Unlike the first modification example, the output voltage generator 11B is not controlled by the voltage monitor 12B. The output voltage Vm supplied from the output voltage generator 11B is input to the PD controller 50B. When the output voltage Vm of the output voltage generator 11B falls below the first threshold value VL, the communication circuit 15 may lower the communication line CC to approximately 0 V. The communication circuit 15 may electrically disconnect the D+/D− line. When the output voltage Vm of the output voltage generator 11B is restored (in other words, when it exceeds the second threshold value VH), the communication circuit 15 may return the voltage of the communication line CC to the original voltage and may make the D+/D− line conductive. As described above, the smartphone 3 can determine that the connection with the charger 1 has been released by a combination with at least one of the interruption of the VBUS line, the interruption of the supply voltage of the communication line CC, the interruption of the constant current source, and the electrical disconnection of the D+/D− line. Therefore, by performing electrical reconnection with the VBUS line Ls, the communication line CC, the D+/D− line, or the like, it is possible to increase the possibility of recognizing that the smartphone 3 has been reconnected to the charger 1.

In the charger 1B, since the DC-DC controller 30B includes the voltage monitor 12B as in the first modification example, the configuration of the PD controller 50B can be simplified. The charger 1B can be directly controlled.

Modification Example 3

Figure 12:
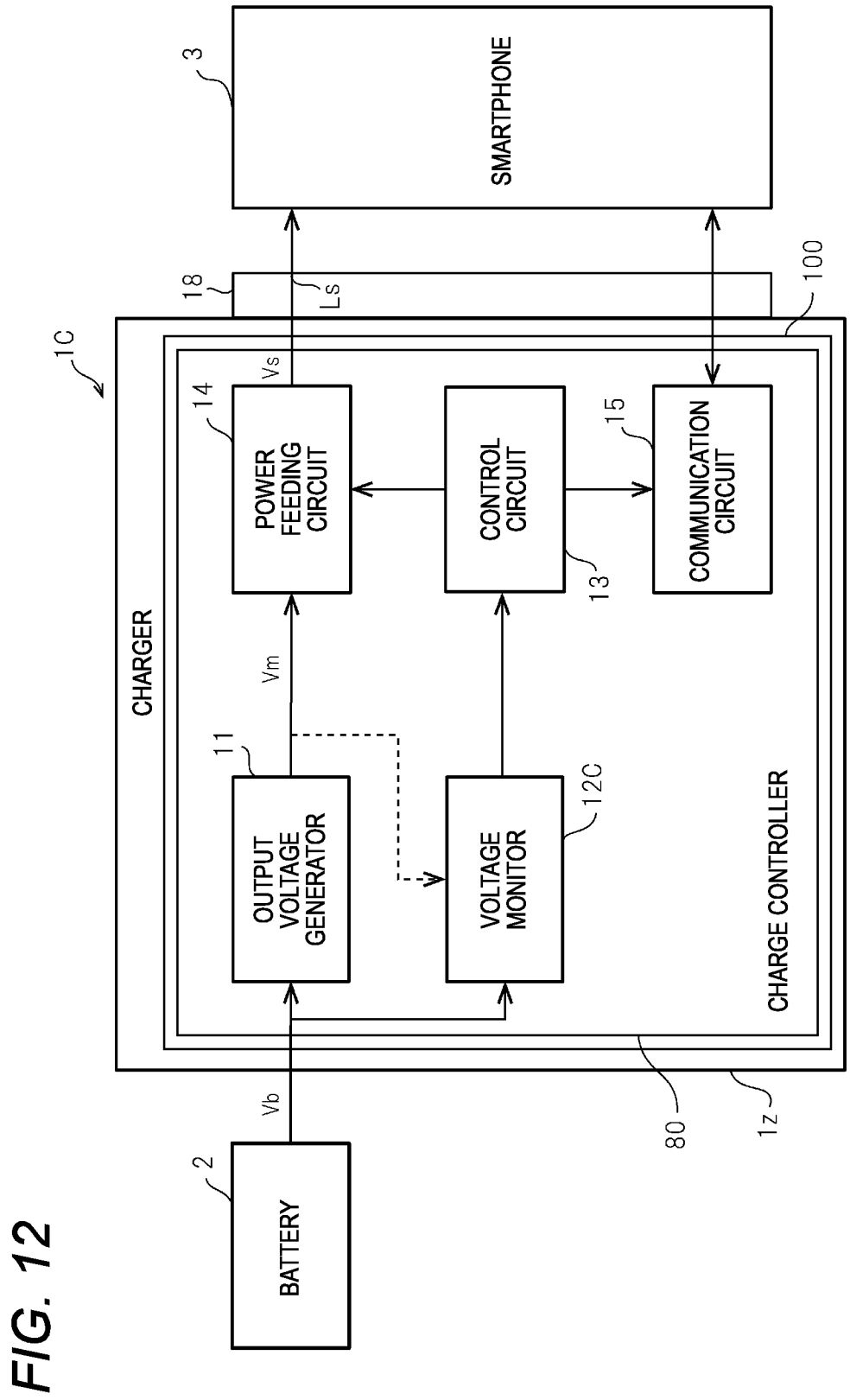
FIG. 12 is a block diagram illustrating a configuration of a charger according to a third modification example.

FIG. 12 is a block diagram illustrating a configuration of a charger 1C according to a third modification example of the embodiment. The charger 1C in the third modification example of the embodiment has substantially the similar configuration as that of the charger 1A in the first modification example. The similar components as those of the charger 1A in the first modification example and the charger 1B in the second modification are denoted by the same reference numerals and letters and the description thereof is omitted.

The charger 1C is constituted by a charge controller 80 which is a single IC module including a DC-DC controller, a PD controller, and a power feeding circuit. The voltage monitor 12C detects the battery voltage Vb on the input side of the output voltage generator 11 or the output voltage Vm on the output side of the output voltage generator 11 and notifies the control circuit 13 of the detection result. When the voltage monitor 12C detects the battery voltage Vb, the first threshold value VL and the second threshold value VH may be, for example, 10.5 V and 11.5 V, respectively. When the voltage monitor 12C detects the output voltage Vm of the output voltage generator 11, the first threshold value VL and the second threshold value VH may be, for example, 4.5 V and 4.8 V, respectively. The control circuit 13 may perform the same operation as in the embodiment described above, the first modification example, or the second modification example.

The charger 1C is easy to handle because the charger 1C is constituted of the charge controller 80, which is a single IC module, without distinguishing between the DC-DC controller and the PD controller.

While various embodiments have been described above with reference to the drawings, it is to be appreciated that the present disclosure is not limited to such examples. It will be apparent to those skilled in the art that various changes and modifications can be made within the scope of the claims and those are naturally within the technical scope of the present disclosure.

In the embodiment described above, the charger is exemplified as including a PD controller having a PD function as a controller that performs charge control. However, the charger may include a controller that complies with a charging standard other than PD. A controller that complies with a charging standard other than PD is, for example, a charging port controller. The charging port controller can control charging according to Type-C Current, which is one of the charging standards for Type-C connection, or the USB charging standard of the related art. When the charging port controller complies with the Type-C Current charging standard, the charging port controller notifies the supply current by the voltage value of the CC pin (CC1 terminal or CC2 terminal). The charging port controller does not perform communication using the BMC code via the communication circuit 15.

In the modification example 3 of the embodiment described above, the charge controller 80 is exemplified as a PD controller including a DC-DC converter built therein. However, it may be a single IC module including another controller. Another controller is, for example, a charge port controller with a built-in DC-DC converter. As a result, the charger can deal with a charging standard having no PD function with a single IC module.

In the embodiment described above, a case where one USB connector is attached to the charger is shown, but a plurality of USB connectors may be attached to the charger. Here, the plurality of electronic devices respectively connected to the plurality of USB connectors may be charged individually or simultaneously.

In the embodiment described above, the in-vehicle battery is exemplified as the power source input to the charger. However, the invention is not limited to this and a power source where the input voltage can vary, such as a photovoltaic power generation panel or a generator, may be used. The power input to the charger may be a power supply device for a vehicle such as an electric vehicle or a hybrid car. The power supply device for a vehicle may include an in-vehicle battery.

As described above, the charger 1 of the embodiment described above may control charging of the smartphone 3. The smartphone 3 is an example of a terminal. The charger 1 may include the output voltage generator 11 which receives the battery voltage Vb of the battery 2 and generates the output voltage Vm. The output voltage generator 11 is an example of a voltage generator, the battery voltage Vb is an example of an input voltage, and the output voltage Vm is an example of an output voltage corresponding to the input voltage. The charger 1 may include the power feeding circuit 14 which supplies the charging voltage Vs to the smartphone 3 via the VBUS line Ls. An example of the charging voltage Vs is the output voltage Vm, and the VBUS line Ls is an example of a voltage supply line through which a voltage is supplied to the terminal. The charger 1 may include the control circuit 13 which controls the supply of the charging voltage Vs by the power feeding circuit 14. When the value of the output voltage Vm or the battery voltage Vb is equal to or higher than the first threshold value VL, the control circuit 13 may make the power feeding circuit 14 supply the charging voltage Vs to the smartphone 3. The first threshold value VL is an example of a first threshold value. The control circuit 13 may electrically cut off the supply of the charging voltage Vs by the power feeding circuit 14 when the value of the output voltage Vm or the value of the battery voltage Vb is lower than the first threshold value VL. The control circuit 13 may resume the supply of the charging voltage Vs by the power feeding circuit 14 when the value of the output voltage Vm or the value of the battery voltage Vb is restored to be equal to or higher than the first threshold value VL. In the above case, when both of a condition where the value of the battery voltage Vb or the value of the output voltage Vm is restored to be equal to or higher than the first threshold value VL and a condition where the value of the charging voltage Vs by the electrically interrupted power feeding circuit 14 is equal to or less than a value of the invalidation threshold voltage VI are satisfied, the supply of the charging voltage Vs by the power feeding circuit 14 may be resumed. The value of the invalidation threshold voltage VI is an example of a first invalidation threshold value.

Thereby, the charger 1 can realize a state where it is electrically disconnected once by electrically disconnecting the VBUS line Ls and then conducting it, and thus the charger can be recognized that the smartphone 3 is newly connected. Therefore, the charger 1 can resume charging after the input voltage is restored. The charger 1 can prevent the state where it is not charged without being noticed by a user.

The power feeding circuit 14 may include the MOSFET 141. The MOSFET 141 is an example of a transistor. When the value of the output voltage Vm or the value of the battery voltage Vb is equal to or higher than the first threshold value VL, the control circuit 13 may apply a first voltage which is a voltage equal to or higher than the threshold voltage Vth of the MOSFET 141 to the gate of the MOSFET 141. When the value of the output voltage Vm or the value of the battery voltage Vb is less than the first threshold value VL, the control circuit 13 may not apply the first voltage to the gate of the MOSFET 141. When the value of the output voltage Vm or the value of the battery voltage Vb is restored to be equal to or higher than the first threshold value VL, the control circuit 13 may resume supplying the first voltage to the gate of the MOSFET 141. In the above case, when both of a condition where the value of the battery voltage Vb or the value of the output voltage Vm is restored to be equal to or higher than the first threshold value VL and a condition where the value of the charging voltage Vs by the electrically interrupted power feeding circuit 14 is equal to or lower than a value of the invalidation threshold voltage VI are satisfied, the control circuit 13 may resume the supply of the first voltage to the gate of the MOSFET 141. The value of the invalidation threshold voltage VI is an example of a second invalidation threshold value.

Thereby, the charger 1 can perform switching operation using the MOSFET 141 and can easily control electrical connection and disconnection of the VBUS line Ls. Therefore, when viewed from the smartphone 3, it is possible to make the smartphone 3 appear to be connected to a new charger 1 by electrical disconnection and connection of the VBUS line, and thus the probability that the smartphone 3 resumes charging is improved.

The control circuit 13 may make the voltage generator output the output voltage Vm to the power feeding circuit 14 when the value of the battery voltage Vb is equal to or higher than the first threshold value VL. The control circuit 13 may not make the voltage generator output the output voltage Vm to the power feeding circuit 14 when the value of the battery voltage Vb is lower than the first threshold value VL. When the value of the input voltage is restored to be equal to or higher than the first threshold value VL, the control circuit 13 may make the voltage generator resume output of the output voltage Vm to the power feeding circuit 14. In the above case, when both of a condition where the value of the battery voltage Vb is restored to be equal to or higher than the first threshold value VL and a condition where the value of the output voltage Vm by the electrically interrupted power feeding circuit 14 is equal to or lower than a value of the invalidation threshold voltage VI are satisfied, the control circuit 13 may resume output of the output voltage Vm to the power feeding circuit 14. The value of the invalidation threshold voltage VI is an example of a third invalidation threshold value.

As a result, the charger 1 does not need to electrically disconnect and connect the VBUS line Ls by switching and the switching control is unnecessary, and thus the operation of the charger 1 can be simplified. Since power is not supplied to the VBUS line Ls by not supplying power to the power feeding circuit 14, power saving can be achieved.

The charger 1 may include the communication circuit 15 which communicates data related to charging control of the smartphone 3 via the communication line. An example of the communication line is the communication line CC, the D+/D− line. The control circuit 13 may supply a voltage to the communication line CC when the value of the output voltage Vm or the value of the battery voltage Vb is equal to or higher than the first threshold value VL. When the value of the output voltage Vm or the value of the battery voltage Vb is less than the first threshold value VL, the control circuit 13 may cut off the supply of voltage to the communication line CC. When the value of the output voltage Vm or the value of the battery voltage Vb is restored to be equal to or higher than the first threshold value VL, the control circuit 13 may resume the supply of the voltage to the communication line CC. Here, when both of a condition where the value of the battery voltage Vb or the value of the output voltage Vm is restored to be equal to or higher than the first threshold value VL and a condition where the value of the output voltage by the electrically interrupted power feeding circuit 14 is equal to or less than a value of the invalidation threshold voltage VI are satisfied, the control circuit 13 may resume the supply of voltage to the communication line. The value of the invalidation threshold voltage VI is an example of a fourth invalidation threshold value.

As a result, when the smartphone 3 does not resume charging when the voltage is supplied and cut off by the power feeding circuit 14, the charger 1 can realize a state in which the communication line CC is once disconnected by electrically disconnecting the communication line CC and then connecting it again. Thereby, the charger 1 can raise possibility that smartphone 3 will recognize that it newly connected to the communication line CC. Therefore, after the input voltage of the charger 1 is restored, the smartphone 3 is more likely to resume charging.

The communication line CC may include the communication line CC for communicating about the charge control with the smartphone 3. The communication line CC is an example of a first communication line. The communication about the charge control is performed, for example, according to the PD protocol. The control circuit 13 may interrupt communication via the communication line CC by cutting off supplying the voltage of the communication line CC or cutting off the constant current source.

Therefore, the possibility that the charger 1 can resume charging of the smartphone 3 whose charging has been stopped by using the communication line CC of USB Type-C increases.

The communication circuit 15 may include a D+/D− line for performing handshaking for recognizing a connection with the smartphone 3. The D+/D− line is an example of a second communication line. The control circuit 13 may cut off the supply of voltage to the D+/D− line by cutting off the D+/D− line.

Thereby, the charger 1 can increase the possibility of resuming charging of the smartphone 3 whose charging has been stopped using the D+/D− terminals for performing signal transmission of the related art such as USB 2.0.

The control circuit 13 may resume the power feeding by the power feeding circuit 14 when the value of the output voltage Vm or the value of the battery voltage Vb is restored to be equal to or higher than the second threshold value VH larger than the first threshold value VL.

Thereby, the charger 1 can have hysteresis at the timing of stopping and resuming power feeding, and thus the charger can prevent hunting in which the power feeding is stopped and resumed repeatedly. Therefore, the charger 1 can resume charging the smartphone 3 after the input voltage has sufficiently returned to a desired value. Therefore, after charging is resumed, the output voltage Vm or the battery voltage Vb falls below the voltage of the first threshold value VL and the possibility to stop charging the smartphone 3 can be reduced, and thus it is possible to expect that the smartphone 3 can be stably charged.

The output voltage generator 11 may include the function of the power feeding circuit 14. Here, an equivalent function can be obtained even when the power is cut off and the power supply is resumed by using the power supply control function of the output voltage generator 11 with the control circuit 13.

When both of a condition where the value of the input voltage or the value of the output voltage is restored to be equal to or higher than the second threshold value VH and a condition where the value of the output voltage by the electrically interrupted power feeding circuit 14 is equal to or lower than a value of the invalidation threshold voltage VI are satisfied, the control circuit 13 may resume the supply of the output voltage by the power feeding circuit 14. The value of the invalidation threshold voltage VI is an example of a fifth invalidation threshold value.

As a result, the charger 1 can resume the supply of the charging voltage Vs after the charging voltage Vs drops to a sufficiently low voltage after the power feeding circuit 14 electrically cuts off the supply of the charging voltage Vs, and thus the resumption probability of charging can be further improved.

The first to fifth invalidation threshold values described above may be different from one another or may be the same.

The present disclosure relates to a charge control device, a charge control method, and the like which can improve the resumption probability of charging a terminal when power supply is restored to a state where power can be supplied.

This application is based on and claims priority from Japanese Patent Application No. 2019-018891 filed on Feb. 5, 2019, the entire contents of which are incorporated herein by reference.

The invention claimed is:

1. A charge control device for controlling charging of a terminal, the charge control device comprising:
    a voltage generator which receives an input voltage and generates a first output voltage corresponding to the input voltage;
    a power feeding circuit which:
        is connected to an output line of the voltage generator;
        receives the first output voltage through the output line;
        is connected to a voltage supply line through which a voltage is supplied to the terminal; and
        supplies a second output voltage to the terminal via the voltage supply line; and
    a control circuit which controls supply of the second output voltage by the power feeding circuit,
    wherein the control circuit is configured:
        to make the power feeding circuit supply the second output voltage when a value of the input voltage or a value of the first output voltage is equal to or higher than a first threshold value;
        to electrically cut off the supply of the second output voltage by the power feeding circuit when the value of the input voltage or the value of the first output voltage is less than the first threshold value; and
        to resume the supply of the second output voltage by the power feeding circuit when both of a condition where the value of the input voltage or the value of the first output voltage returns to be equal to or higher than the first threshold value and a condition where a value of a voltage of the voltage supply line is equal to or less than a first invalidation threshold value are satisfied.

2. The charge control device according to claim 1,
    wherein the power feeding circuit comprises a transistor, and
    wherein the control circuit is configured:
        to supply a first voltage which is a voltage equal to or higher than a threshold voltage of the transistor to the power feeding circuit when the value of the input voltage or the value of the first output voltage is equal to or higher than the first threshold value;
        not to supply the first voltage to the power feeding circuit when the value of the input voltage or the value of the first output voltage is less than the first threshold value; and
        to resume the supply of the first voltage to the power feeding circuit when the value of the input voltage or the value of the first output voltage returns to be equal to or higher than the first threshold value.

3. The charge control device according to claim 2,
    wherein the control circuit resumes the supply of the first voltage to the power feeding circuit when both of the condition where the value of the input voltage or the value of the first output voltage returns to be equal to or higher than the first threshold value and the condition where the value of the voltage of the voltage supply line is equal to or less than a second invalidation threshold value are satisfied.

4. The charge control device according to claim 1,
    wherein the control circuit is configured:
        to make the voltage generator output the first output voltage to the power feeding circuit when the value of the input voltage is equal to or higher than the first threshold value;
        not to make the voltage generator output the first output voltage to the power feeding circuit when the value of the input voltage is less than the first threshold value; and
        to make the voltage generator resume output of the first output voltage to the power feeding circuit when the value of the input voltage returns to be equal to or higher than the first threshold value.

5. The charge control device according to claim 4,
    wherein the control circuit makes the voltage generator resume output of the first output voltage to the power feeding circuit when both of a condition where the value of the input voltage returns to be equal to or higher than the first threshold value and a condition where the value of the voltage of the voltage supply line is equal to or less than a third invalidation threshold value are satisfied.

6. The charge control device according to claim 1, further comprising:
a communication circuit which communicates data related to charge control of the terminal via at least one communication line,
wherein the control circuit is configured:
to supply a voltage to the at least one communication line when the value of the input voltage or the value of the first output voltage is equal to or higher than the first threshold value;
to cut off supply of the voltage to the at least one communication line when the value of the input voltage or the value of the first output voltage is less than the first threshold value; and
to resume the supply of the voltage to the at least one communication line when the value of the input voltage or the value of the first output voltage returns to be equal to or higher than the first threshold value.

7. The charge control device according to claim 6,
wherein the control circuit resumes the supply of the voltage to the at least one communication line when both of the condition where the value of the input voltage or the value of the first output voltage returns to be equal to or higher than the first threshold value and a condition where the value of the voltage of the voltage supply line is equal to or less than a fourth invalidation threshold value are satisfied.

8. The charge control device according to claim 6,
wherein the at least one communication line comprises a first communication line for communicating about the charge control with the terminal, and
wherein the control circuit cuts off communication via the first communication line by cutting off supplying a voltage of the first communication line or cutting off a constant current source.

9. The charge control device according to claim 6,
wherein the at least one communication line comprises a second communication line for performing a handshake to recognize a connection with the terminal, and
wherein the control circuit cuts off supply of a voltage to the second communication line by disconnecting the second communication line.

10. The charge control device according to claim 1,
wherein the control circuit resumes power feeding by the power feeding circuit when the value of the input voltage or the value of the first output voltage returns to be equal to or higher than a second threshold value greater than the first threshold value.

11. The charge control device according to claim 10,
wherein the control circuit resumes the supply of the second output voltage by the power feeding circuit when both of a condition where the value of the input voltage or the value of the first output voltage returns to be equal to or higher than the second threshold value and a condition where the value of the voltage of the voltage supply line is equal to or less than a fifth invalidation threshold value are satisfied.

12. The charge control device according to claim 1,
wherein the charge control device controls charging by a universal serial bus.

13. The charge control device according to claim 1,
wherein the input voltage is a voltage input from a battery mounted on a vehicle or a power supply device for the vehicle.

14. The charge control device according to claim 1, wherein
the control circuit is configured to wait until the voltage of the voltage supply line decreases and becomes equal to or less than the first invalidation value based on a time characteristic of a voltage drop, before resuming the supply of the second output voltage by the power feeding circuit.

15. The charge control device according to claim 1, wherein
the control circuit is configured:
to monitor the value of the voltage of the voltage supply line; and
to wait until the value of the voltage of the voltage supply line decreases and becomes equal to or less than the first invalidation value before resuming the supply of the second output voltage by the power feeding circuit.

16. A charge control method for controlling charging of a terminal, the charge control method comprising:
receiving an input voltage and generating a first output voltage corresponding to the input voltage;
receiving, by a power feeding circuit, the first output voltage and supplying, by the power feeding circuit, a second output voltage to the terminal via a voltage supply line for supplying a voltage to the terminal, the voltage supply line being connected to the power feeding circuit; and
controlling supply of the second output voltage by the power feeding circuit,
wherein said controlling the supply of the second output voltage comprises:
supplying the second output voltage via the voltage supply line when a value of the input voltage or a value of the first output voltage is equal to or higher than a first threshold value;
cutting off the supply of the second output voltage via the voltage supply line when the value of the input voltage or the value of the first output voltage is less than the first threshold value; and
resuming the supply of the second output voltage via the voltage supply line when both of a condition where the value of the input voltage or the value of the first output voltage returns to be equal to or higher than the first threshold value and a condition where a value of a voltage of the voltage supply line is equal to or less than a first invalidation threshold value are satisfied.

* * * * *